(12) United States Patent
Uozumi

(10) Patent No.: US 7,682,715 B2
(45) Date of Patent: Mar. 23, 2010

(54) VEHICLE EQUIPPED WITH FUEL CELL SYSTEM

(75) Inventor: Tetsuo Uozumi, Kanagawa-ken (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 1406 days.

(21) Appl. No.: 10/853,758

(22) Filed: May 26, 2004

(65) Prior Publication Data
US 2004/0262059 A1 Dec. 30, 2004

(30) Foreign Application Priority Data
Jun. 24, 2003 (JP) .............................. 2003-179557

(51) Int. Cl.
*H01M 8/10* (2006.01)
*B60K 1/00* (2006.01)

(52) U.S. Cl. ........................................ 429/13; 180/65.3

(58) Field of Classification Search .............. 296/37.14; 180/65.12, 65.3; 429/12, 13, 22, 26, 34, 429/38, 24, 25
See application file for complete search history.

(56) References Cited

U.S. PATENT DOCUMENTS 6,145,907 A * 11/2000 Maruyama et al. ....... 296/37.14
6,432,568 B1   8/2002 Salvador et al.
7,282,288 B2 * 10/2007 Yoshizawa et al. ............ 429/23
2002/0051898 A1   5/2002 Moulthrop, Jr. et al.
2003/0049504 A1   3/2003 Wheat et al.
2003/0062204 A1 *  4/2003 Kato et al. ................. 180/65.1
2003/0082424 A1 *  5/2003 Kohrs et al. .................... 429/27
2003/0085135 A1   5/2003 Andrews et al.
2005/0139402 A1 *  6/2005 Yamashita ................. 180/65.3
2005/0224265 A1 * 10/2005 Mizuno ..................... 180/65.3
2006/0237248 A1 * 10/2006 Hayashi ..................... 180/68.5

FOREIGN PATENT DOCUMENTS

| DE | 201 08 808 U1 | 8/2001 |
| JP | 2000-257430 A | 9/2000 |
| JP | 2001-268720 A | 9/2001 |
| JP | 2002-158024 A | 5/2002 |
| WO | WO 03/019709 A1 | 3/2003 |

* cited by examiner

*Primary Examiner*—Patrick Ryan
*Assistant Examiner*—Monique Wills
(74) *Attorney, Agent, or Firm*—Foley & Lardner LLP (57) ABSTRACT

A vehicle equipped with a fuel cell system is disclosed including a vehicle body having a floor, and a fuel cell system disposed below the floor and including a fuel cell stack and a water supply device connected to a water storage tank. The water supply device includes component elements (a pump, a water supply conduit and a water recovery conduit) that are disposed below the floor of the vehicle body in a higher area than the water storage tank.

11 Claims, 5 Drawing Sheets

FIG. 1

← FORWARD OF VEHICLE

FIG. 2

← FORWARD OF VEHICLE

FIG. 3

FORWARD OF VEHICLE

VEHICLE EQUIPPED WITH FUEL CELL SYSTEM

BACKGROUND OF THE INVENTION

1. Field of the Invention

The present invention relates to a fuel cell vehicle equipped with a fuel cell system that has a water supply device adapted to supply humidifying water to a fuel cell stack and, more particularly, to a technology for avoiding associated delivery conduits and component parts from damages resulting from the freezing of water at a temperature below the freezing point.

2. Description of the Related Art

As counter measure to count environmental issues in recent years, particularly air pollutions resulting from exhaust gas emissions of automobiles and global warming issues resulting from carbon dioxide emission, a fuel cell technology has been attracting public attention as counter measure that is able to achieve clean emission and high-energy efficiency. A fuel cell serves as an energy conversion system that supplies hydrogen or hydrogen rich gas, serving as fuel, and air to an electrolyte-electrocatalyst composite body to allow electrochemical reaction to occur for thereby converting chemical energy to electrical energy. Particularly, a solid polymer electrolyte fuel cell employing a solid polymer membrane is low in cost and easy to be formed in a compact structure while having a high energy density and is highly expected to be applied as a power supply for a moving object such as an automobile.

By the way, with the solid polymer electrolyte fuel cell, the solid polymer membrane functions as an ion conductive electrolyte as a result of water being saturated and, also, has a function to separate hydrogen and oxygen from one another. If water content in the solid polymer membrane is insufficient, ion resistance increases to cause hydrogen and oxygen to mix with one another, resulting in an inability of serving as the fuel cell to generate electric power. In the meanwhile, with the solid polymer electrolyte fuel cell, when hydrogen ions dissociated in a hydrogen electrode as a result of generating electric power pass through the electrolyte membrane accompanied with movement of water, and the hydrogen electrode is liable to be dried. Also, if steam contained in hydrogen or air that are supplied is low in content, the solid electrolyte membrane tends to be dried in areas in the vicinity of respective reaction gas inlets.

Because of such reasons, there has been a need for the solid electrolyte membrane of the solid polymer electrolyte fuel cell to be supplied with water to humidify the solid polymer electrolyte in a positive manner up to now and, to this end, some kind of humidifying means has been employed for humidifying the electrolyte per se or for humidifying hydrogen and air to be supplied.

With such humidifying means in the solid polymer electrolyte fuel cell described above, a need arises for counter measure to be undertaken for countering the freezing of humidifying water in consideration of use in cold climates. A probability occurs in humidifying water that would freeze and expand in associated delivery conduits and component parts at a temperature below the freezing point, resulting in a fear of causing damages in no small measure such as damages in the delivery conduits and the component parts. Therefore, for the purpose of avoiding such an issue, a proposal has heretofore been made to provide a technology of recycling humidifying water into a freezing tank (see first related art: Japanese Patent Provisional Publication No. 2000-257430 and second related art: Japanese Patent Provisional Publication No. 2002-158024).

SUMMARY OF THE INVENTION

By the way, in a case where a fuel cell system is installed on a vehicle, it is considered that the fuel cell system is installed in an area beneath a floor of the vehicle with a view to precluding a vehicle compartment from being narrowed due to the presence of the fuel cell system. However, no consideration has been undertaken up to these days for an approach to recover humidifying water in the area below the vehicle floor, and an issue arises in an inability to count the freezing of water at the temperature below the freezing point. In a case wherein the fuel cell system having a water supply device is installed on the vehicle at the area below the floor, there are further limitations in height of the area than those in which the other component parts are disposed and, under such a situation, if no appropriate layout is undertaken to avoid means or mechanisms (such as the freezing tank) from damages resulting from the freezing of water at the temperature below the freezing point, these component parts have inability to exhibit inherent effects in a sufficient manner whereupon humidifying water results in freezing and expanding in the associated delivery conduits and component parts at the temperature below the freezing point, causing damages to occur in the associated delivery conduits and component parts.

The present invention has been completed with a view to addressing the issues of the related art described above and has an object to provide a vehicle, equipped with a fuel cell system, that even when the vehicle is equipped with the fuel cell system employing a water supply devices, is possible to avoid delivery conduits and component parts from damages due to the freezing of water at a temperature below the freezing point while making it possible to start up and operate the fuel cell system even at the temperature below the freezing point.

To achieve the above object, a vehicle equipped with a fuel cell system comprises a vehicle body having a floor, and a fuel cell system disposed below the floor and including a fuel cell stack and a water supply device connected to a water storage tank, wherein the water supply device includes component elements that are disposed below the floor of the vehicle body in a higher area than the water storage tank.

DETAILED DESCRIPTION OF THE INVENTION

Hereinafter, a vehicle equipped with a fuel cell system to which the present invention is applied will be described with reference to the accompanying drawings.

FIRST EMBODIMENT

Figure 1:
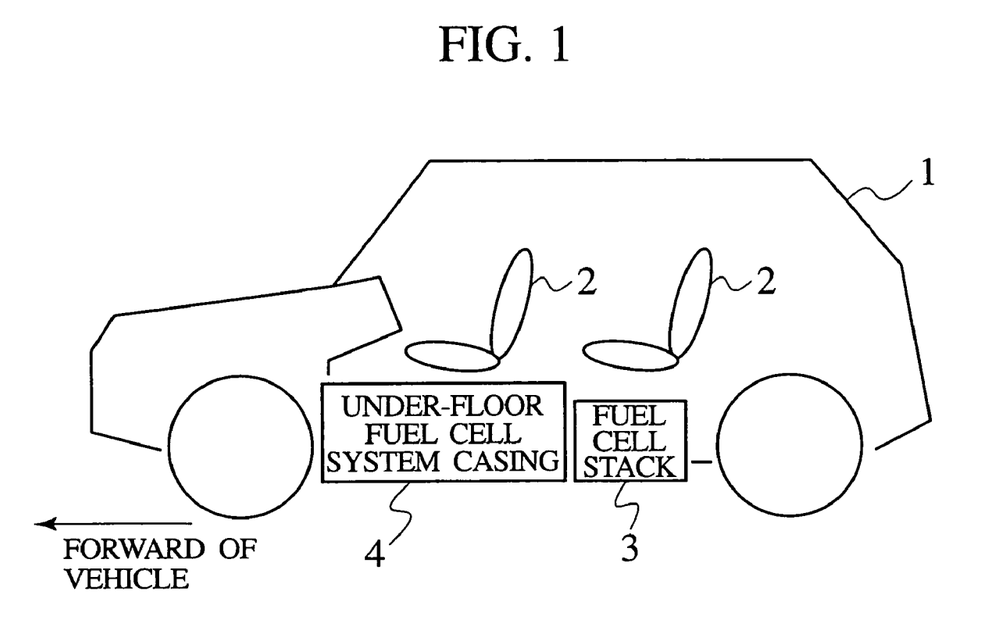
FIG. 1 is a typical view illustrating a condition under which a fuel cell system is mounted on a vehicle at an area below a floor thereof.

Referring to FIG. 1, a vehicle equipped with a fuel cell system of a first embodiment is comprised of a fuel cell stack 3, adapted to be supplied with hydrogen and air to generate electric power, and an under-floor fuel cell system casing 4 that accommodates therein a variety of mechanisms necessary for operating the fuel cell stack 3, both of which are disposed under a floor of a vehicle body 1, that is, below a vehicle floor panel, on which seats 2 are fixedly secured in a vehicle compartment.

The fuel cell stack 3 has a structure that includes electric power generating cells overlapped in multiple stages in a way to allow an electrolyte-electrocatalyst composite body to be sandwiched between a fuel electrode, supplied with hydrogen, and an air electrode supplied with oxygen (air), thereby converting chemical energy into electrical energy through electrochemical reaction. In each electric power-generating cell, the fuel electrode is supplied with hydrogen to dissociate hydrogen ions and electrons, which pass through the electrolyte and an external circuit, respectively, to generate electric power and move to the air electrode, respectively. Also, the air electrode serves to react oxygen in supplied air with the hydrogen ions and the electrons to form water, which in turn is expelled to the outside.

As the electrolyte of the fuel cell stack 3, a solid polymer electrolyte is employed on consideration of a high energy density capability, reduction in costs and reduction in weight. The solid polymer electrolyte is comprised of an ion (proton) conductive polymer membrane such as an ion exchange membrane made of such as fluorocarbon resin. As previously mentioned, due to the existence of an ability of saturating water to provide a function of the ion conductive electrolyte, the fuel cell stack 3 needs to be supplied with water for humidifying the solid polymer electrolyte.

The under-floor fuel cell system casing 4 internally accommodates various mechanisms, such as a fuel supply system that supplies hydrogen (or hydrogen rich gas) to the fuel cell stack 3 as fuel, an air supply system that supplies oxidant (air), a humidifying means that supplies pure water to the fuel cell stack 3 for humidification, and a cooling means for supplying the fuel cell stack 3. These various mechanisms serve to control operation of the fuel cell stack 3. The under floor fuel cell system casing 1 has an outer profile that is contoured along the shape of a lower surface of the vehicle floor panel in order to enable an under-floor space of the vehicle body 1 to be effectively utilized. And, the fuel cell system case 4 is installed on the under floor of the vehicle body 1 in close contact with the under floor of the vehicle body-floor panel.

Figure 2:
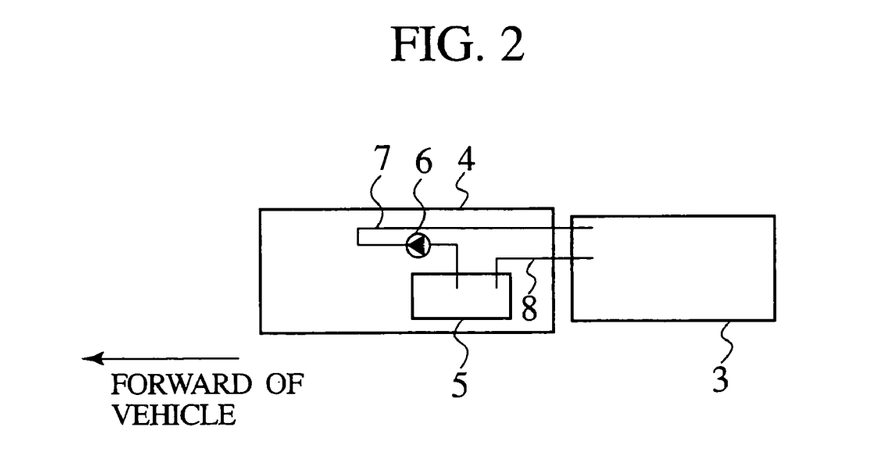
FIG. 2 is a typical view illustrating a layout of a water supply device forming part of a fuel cell vehicle of a first embodiment of the present invention.

As shown in FIG. 2, received inside the under-floor fuel cell system casing 4 is the humidifying means that serves as a water supply device by which pure water is supplied to the fuel cell stack 3 for humidification. Of course, outside of accommodating such a humidifying means, although the other mechanisms, such as the fuel supply system, are accommodated inside the under-floor fuel supply system case 4 as previously noted, the other mechanisms are omitted in FIG. 2.

The humidifying means is comprised of a pump 6 for drawing pure water from a water storage tank 5 available to store pure water in a freezing state even at a temperature below the freezing point, a water delivery conduit 7 that forms a path through which pure water, drawn from the pump 6, is delivered to the fuel cell stack 3 (or the humidifier), and a water recovery conduit 8 through which water in excess is recovered from the fuel cell stack 3. During operation of the fuel cell stack 3, the pump 6 draws pure water from the water storage tank 5 to be supplied to the fuel cell stack 3 through the water delivery conduit 7. Further, when operation of the fuel cell stack 3 is stopped, a whole of pure water inside the system is recovered to the water storage tank 5 in preparation for the freezing of pure water at the temperature below the freezing point.

In the illustrative embodiment, inside the under-floor fuel cell system casing 4 installed on the vehicle body 1 in the under-floor space thereof, the component parts (including the pump 6, the water delivery conduit 7 and the water recovery conduit 8) of the humidifying means are disposed at a higher position than the water storage tank 5, e.g., in a position remotest from a road surface.

Thus, by setting up the component parts of the humidifying means in the higher position than the water storage tank 5, when recovering pure water from the system into the water storage tank 5 with a view to precluding the freezing of water at the temperature below the freezing point, water prevailing in the humidifying means such as the pump 6, the water delivery conduit 7 and the water recovery conduit 8 results in a natural drop into the water storage tank 5 by gravitation. The presence of such a layout structure results in improvement over a capability of recovering pure water from the humidifying means into the water storage tank 5 for thereby reducing residual pure water that would remain in the pump 6, the water delivery conduit 7 and the water recovery conduit 8. This results in a capability of avoiding the pump 6, the water delivery conduit 7 and the water recovery conduit 8 from damages due to the freezing of pure water.

Also, although the above-described illustrative embodiment has been described with reference to the humidifying means adapted to supply pure water to the fuel cell stack 3 for humidification, an alternative structure may include application wherein the cooling means for cooling the fuel cell stack 3 takes the form of a structure to use pure water, stored in the water storage tank 5, as refrigerant and supply this pure water to the fuel cell stack 3 to cool the same. If the cooling means takes the form of such a structure, the cooling means serves as a water supply unit and, hence, component parts of such a cooling means are disposed above the water storage tank 5.

SECOND EMBODIMENT

The second illustrative embodiment contemplates to provide an arrangement wherein component parts of a water supply device are integrated as a water supply unit that is disposed in an embossed area, of an under-floor fuel cell system casing, that is embossed toward a vehicle compartment in conformity with a floor tunnel section of a vehicle body-floor panel.

Figure 3:
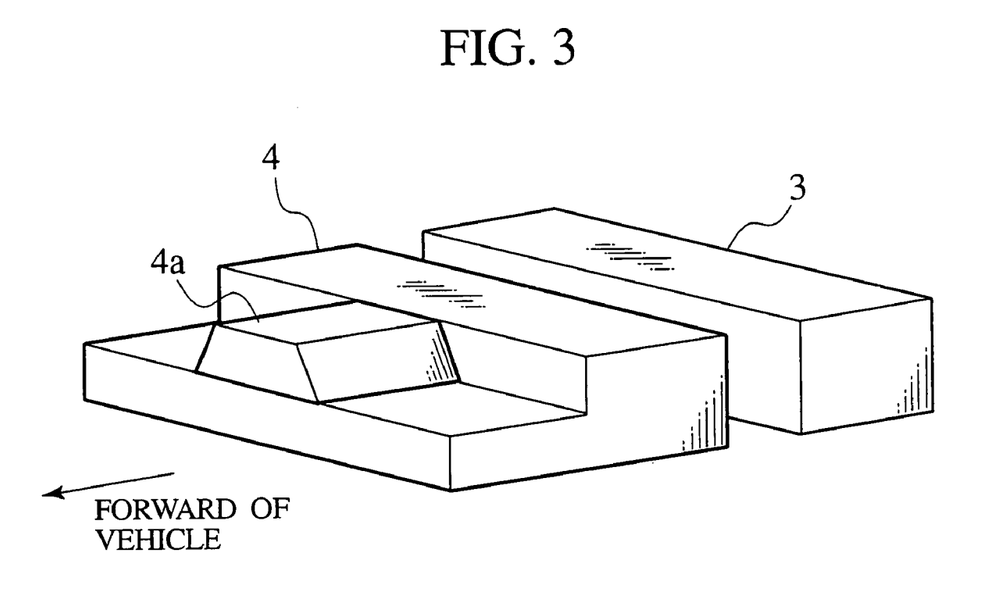
FIG. 3 is a perspective view of an example of an under floor fuel cell system casing forming part of the fuel cell vehicle of the first embodiment shown in FIG. 2.

There are many probabilities for the vehicle body-floor panel to be formed with a floor tunnel section with a shape embossed toward the vehicle compartment in a vicinity of a central area of the vehicle body-floor panel with a view to providing increased rigidity. When installing the under-floor fuel cell system casing 4 to the floor panel of the vehicle body in close contact to a lower surface thereof, the under-floor fuel cell system casing 4 is formed with an embossed section 4a that is embossed toward the vehicle compartment in conformity with the floor tunnel section of the vehicle body-floor panel as shown in FIG. 3.

Figure 4:
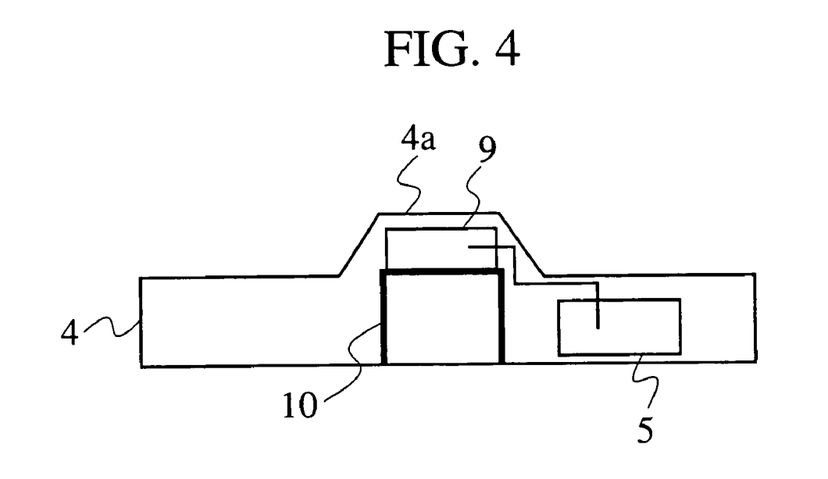
FIG. 4 is a typical view illustrating a layout of a water supply device forming part of a fuel cell vehicle of a second embodiment of the present invention.

Therefore, the second illustrative embodiment contemplates to integrate the component parts of the water supply device into the water supply unit 9 and set up this water supply unit 9 in the embossed section 4a of the under-floor fuel cell system casing 4 as shown in FIG. 4. And, the water storage tank 5 is arranged to be disposed on the under-floor fuel cell system casing 4 in a wide space at a lower area. This results in arrangement in that the component parts of the water supply device assume higher positions than the water storage tank 5.

With the second illustrative embodiment, since the water supply unit 9 is disposed in the embossed section 4a of the under-floor fuel cell system casing 4 and there are less number of other component parts located on the same height as the water supply unit 9, it becomes possible to effectively utilize a space inside the embossed section 4a of the under-floor fuel cell system casing 4 for thereby permitting the component parts of the water supply device to be disposed in a coplanar relationship to provide a unitary structure. Accordingly, this results in a capability of providing a less vertical difference in a pure water flow path inside of the water supply unit 9 to provide a further ease of recovering pure water, enabling further reduction in residual pure water.

Further, in general, the flow rate of pure water is less than that of refrigerant to be supplied to the fuel cell stack 3 and that of air to be used for reaction, and respective component parts of the water supply device are smaller in size and lighter in weight than those of component parts of the other system. Consequently, a structure in which these component parts are arranged to be located in an increasingly higher space within the under-floor fuel cell system casing 4 is more advantageous in structure than the other structure wherein heavy component parts of the other system are disposed, and is possible to compel a support structure 10 to be simplified in terms of G to be applied in back and force and from side to side.

Furthermore, in order for pure water to have a lowered electric conductivity while reducing foreign substances, it is probable for the water supply device to have an ion removal filter or a foreign substance removal filter. Therefore, it is desired for layout of each component part to be determined while taking convenience of work for replacement of these filters into consideration. Thus, the second illustrative embodiment contemplates to locate the water supply unit 9 in a position easy for work to be done during maintenance under a circumstance where the fuel cell system is taken off from the vehicle body, resulting in improved maintenance workability.

THIRD EMBODIMENT

Figure 5:
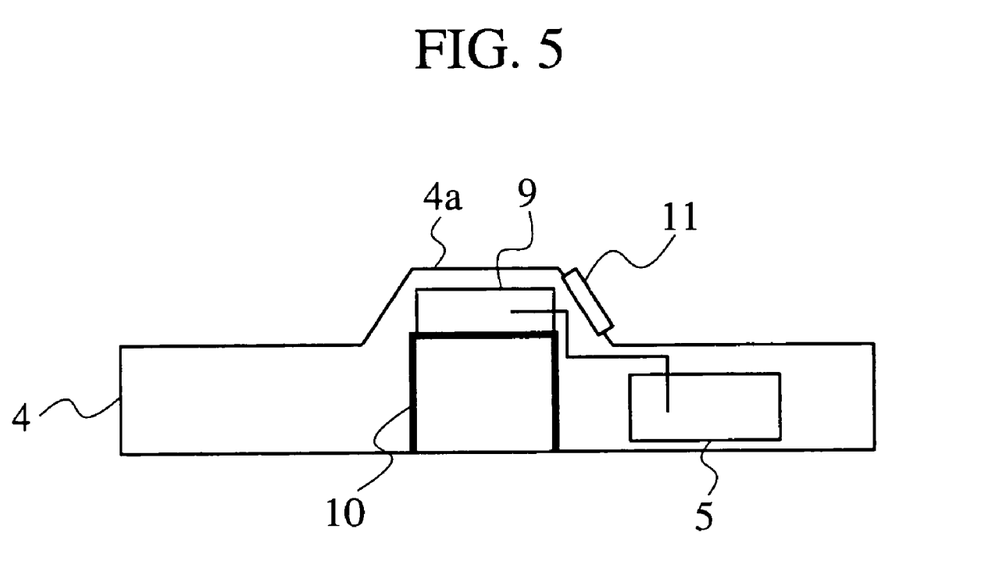
FIG. 5 is a typical view illustrating a fuel cell vehicle, of a third embodiment of the present invention, employing an under floor fuel cell system casing formed with a work access opening.

While the third illustrative embodiment has the same fundamental structure as that of the second illustrative embodiment set forth above, the second illustrative embodiment features the provision of a work access opening 11 that is formed in the embossed section 4a of the under-floor fuel cell system casing 4 in correspondence with the setup position of the water supply unit 9, as shown in FIG. 5. Further, although illustration in the drawing is omitted, the floor tunnel section of the vehicle body-floor panel is formed with a similar work access opening at the same position as that in which the work access opening 11 is formed, with both of these work access openings mutually communicating each other.

As set forth above, it is probable for the water supply device to be provided with the ion removal filter and the foreign substance removal filter in order to decrease the electric conductivity of pure water and the foreign substances, and it is necessary to take a workability in replacement of these filters into consideration. In this illustrative embodiment, due to the presence of the work access openings 11 for maintenance disposed in the embossed section 4a of the under-floor fuel cell system casing 4 and the floor tunnel section of the vehicle body-floor panel, it is possible to perform maintenance from the vehicle compartment. Accordingly, maintenance can be performed for replacement of the filters without taking off the fuel cell system from the vehicle body, resulting in remarkable improvement in workability during maintenance.

While the third illustrative embodiment has been described with reference to an example wherein the work access openings for maintenance are disposed in the embossed section 4a of the under-floor fuel cell system casing 4 and the floor tunnel section of the vehicle body-floor panel, a similar advantage can be obtained even in an alternative, where the water supply unit 9 is disposed in the other area inside the under-floor fuel cell system casing 4, by providing the work access openings 11 for maintenance in positions to comply with such a setup position.

FOURTH EMBODIMENT

Figure 6:
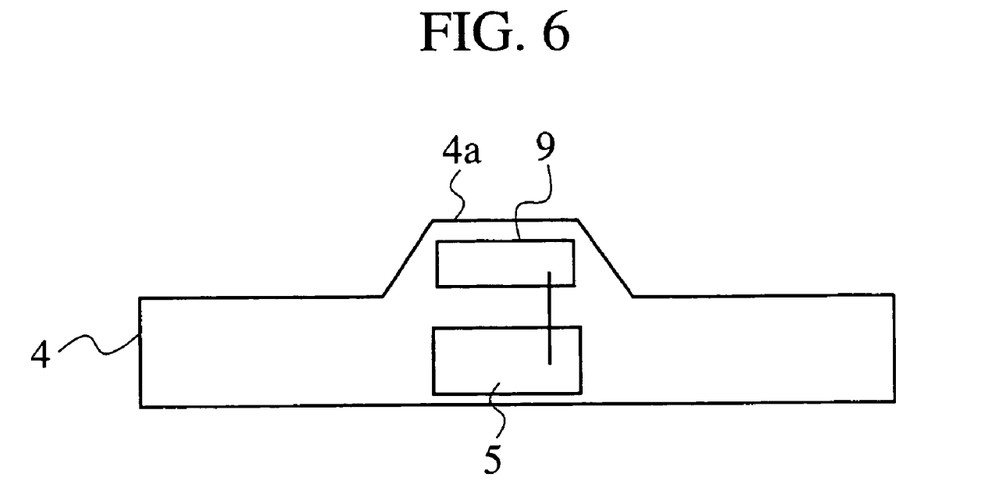
FIG. 6 is a typical view illustrating a layout of a water supply device forming part of a fuel cell vehicle of a fourth embodiment of the present invention.

A fourth illustrative embodiment has the same fundamental structure as that of the second illustrative embodiment set forth above and, in this illustrative embodiment, the water storage tank 5 is placed directly below the water supply unit 9 as shown in FIG. 6.

When employing a layout such as one of this illustrative embodiment, a conduit connected between the water storage tank 5 and the water supply unit 9 results in a short length, enabling reduction in the amount of pure water inside the water supply device while enabling the water storage tank 5 to have a minimized capacity. As a result, this leads to reduction in weight of the under-floor fuel cell system casing 4 and, thus, reduction in weight of a whole of the vehicle equipped with the fuel cell system.

Further, the water storage tank 5 and the pump inside of the water supply unit 9 are placed to be closer to one another and the conduit between these component parts is shortened, providing improvement over the flow rate of pure water caused by the pump and controllability in pressure.

Figure 7:
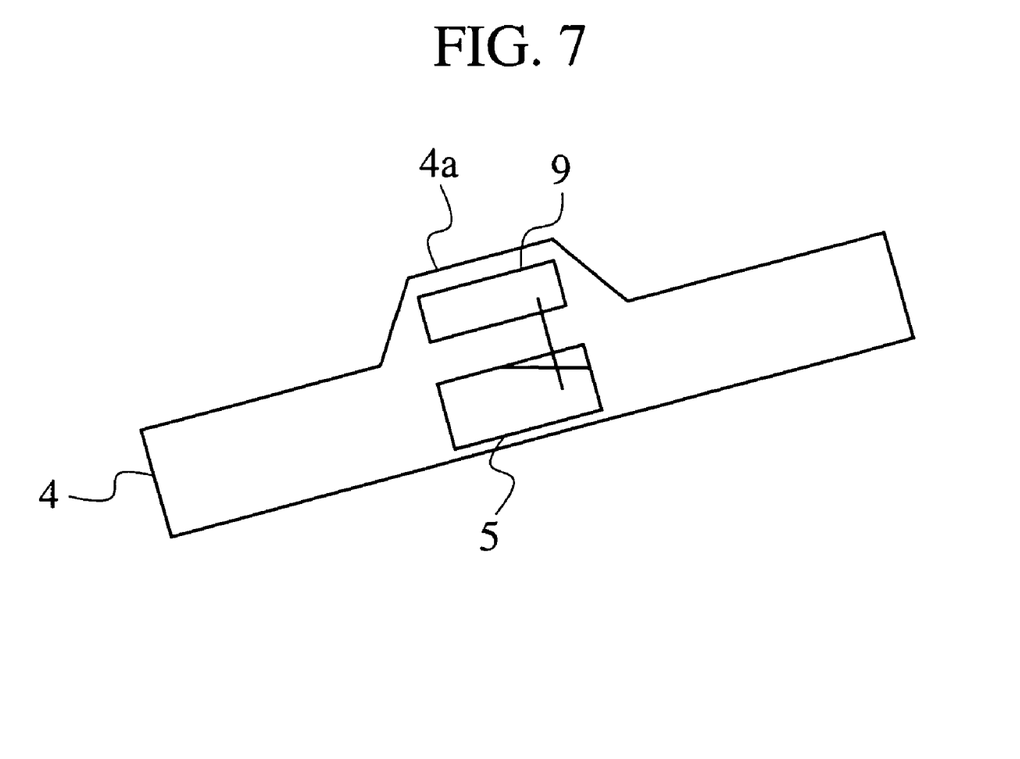
FIG. 7 is a typical view of the water supply device forming part of the fuel cell vehicle of the fourth embodiment illustrating a status in which a vehicle is swayed.

Additionally, as shown in FIG. 7, even in a case where the under-floor fuel cell system casing 4 is applied with a force of gravity from front and back and from side to side or when the vehicle is swayed to one side, it becomes easy for the pump to assume a certain higher position than a water level of the water storage tank 5 at all times, providing improvement in a freedom in placement of the pump. Namely, in an event that the water storage tank 5 is not placed directly below the water supply unit 9, although it is conceivable that depending upon circumstances under which the force of gravity acts on the vehicle body or the vehicle is swayed, a vertical height between the water surface and the pump fluctuates to cause adverse affect on proper operation of the pump, the fourth illustrative embodiment makes it possible to avoid such trouble that may arise. In addition, another advantage results in view of the number of component parts, mass and costs.

Also, here, although description has been made in connection with a situation where the water supply unit 9 is disposed in the embossed section 4a of the under-floor fuel cell system casing 4, a similar effect is obtained by placing the water storage tank 5 directly below the water supply unit 9 even in a situation where the water supply unit 9 is disposed in the other area within the under-floor fuel cell system casing 4.

FIFTH EMBODIMENT

Figure 8:
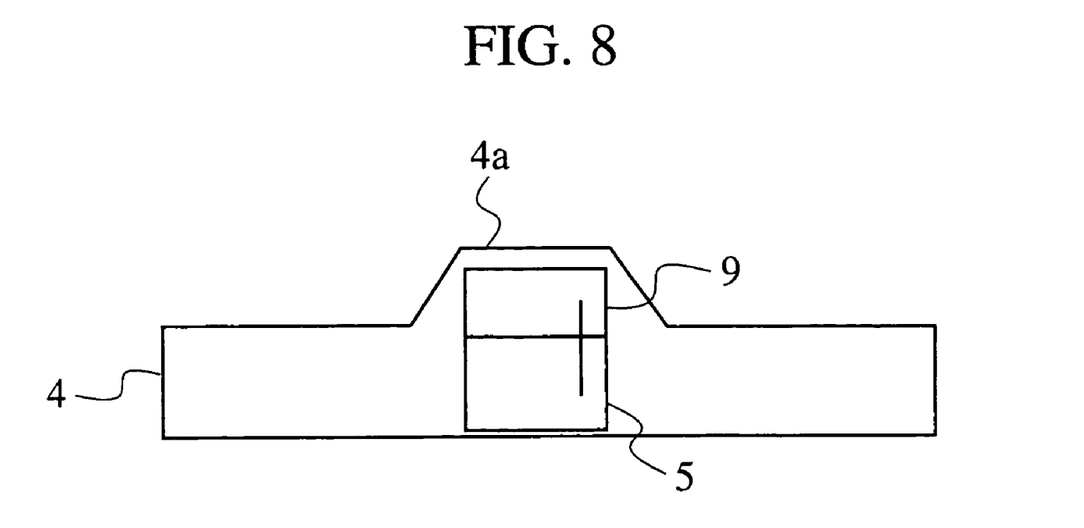
FIG. 8 is a typical view illustrating a layout of a water supply device forming part of a fuel cell vehicle of a fifth embodiment of the present invention.

Even with a fifth illustrative embodiment, the water storage tank 5 is located directly below the water supply unit 9 like in the fourth illustrative embodiment set forth above and, in this illustrative embodiment, the water storage tank 5 is integrated with the water supply unit 9 as shown in FIG. 8.

With the fifth illustrative embodiment, since the water storage tank 5 and the water supply unit 9 are integrated with one another, a whole of the water supply device, in which the water storage tank 5 is also included as the respective component parts forming the water supply unit 9, can be structured into one module, enabling further reduction in length of the delivery conduit of the water supply device and further miniaturization in each component part of the water storage tank 5 to be realized. Accordingly, the respective component parts and the delivery conduits of the water supply device can be arranged in a layout to enhance further efficient recovery of purer water, providing further improvement over a capability of recovering pure water. Also, another advantage includes remarkable reduction in the number of component parts, mass and costs.

SIXTH EMBODIMENT

A sixth illustrative embodiment is described below in conjunction with a case where the under floor fuel cell system casing is formed with a second embossed section, that is embossed into a space that normally remains in no use inside the vehicle compartment, such as a dead space below a seat of the vehicle compartment and component parts of a humidifying means are located in the second embossed section.

Figure 9:
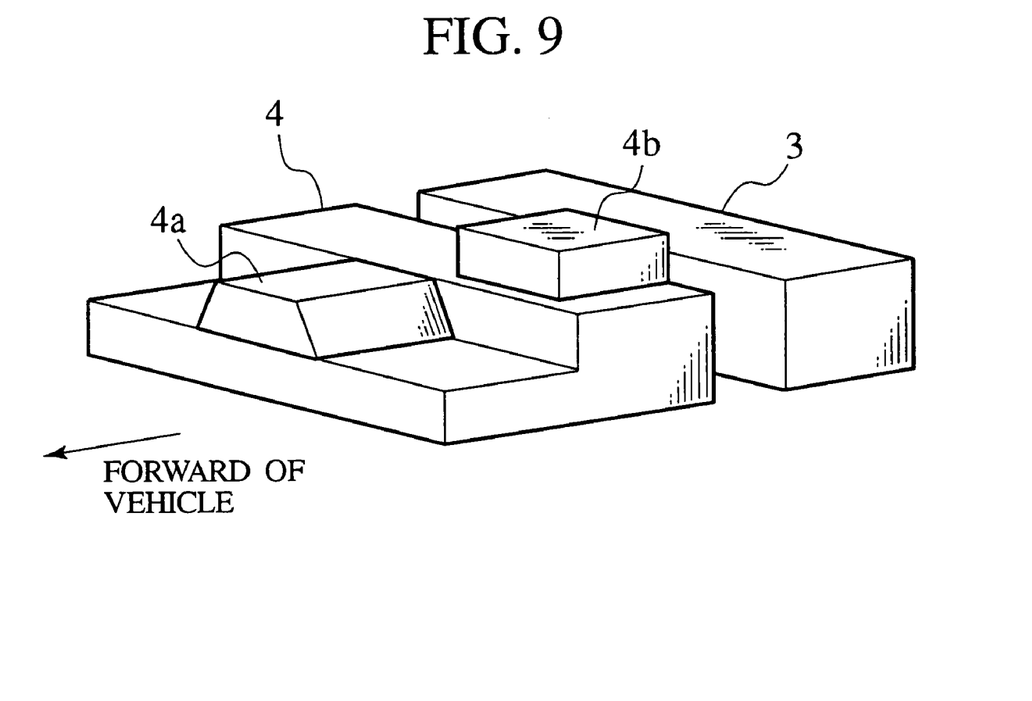
FIG. 9 is a perspective view of one example of an under floor fuel cell system casing forming part of a fuel cell vehicle of a sixth embodiment of the present invention.
Figure 10:
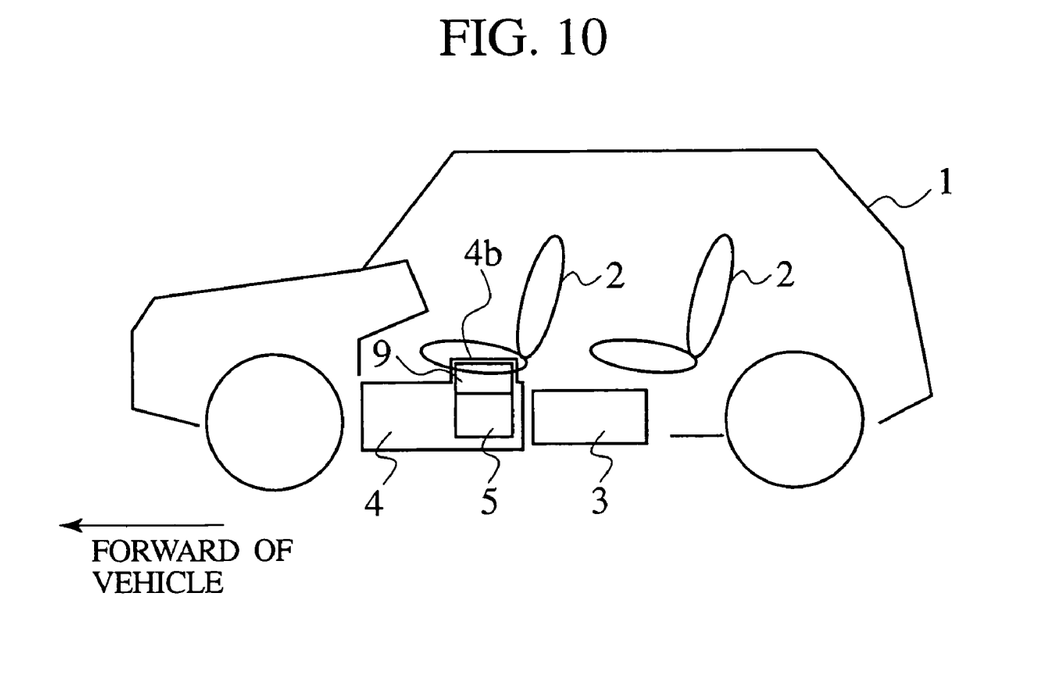
FIG. 10 is a perspective view of another example of the under floor fuel cell system casing forming part of the fuel cell vehicle of a sixth embodiment of the present invention.

That is, with the sixth illustrative embodiment, as shown in FIGS. 9 and 10, the second embossed section referred as 4b is formed on the under-floor fuel cell system casing 4 at an area below the seat 2. Further, though illustration is omitted, the vehicle floor panel of the vehicle body 1 is formed with an opening portion with a shape, corresponding to that of the second embossed section 4b, at a position below the seat 2 so as to allow the second embossed section 4b of the under-floor fuel cell system casing 4 to protrude through such an opening portion into a spacing below the seat 2 of the vehicle compartment.

Inside the under-floor fuel cell system casing 4, the component parts (forming the water supply unit 9) of the water supply device are disposed in the second embossed section 4b, and the water storage tank 5 is disposed below the water supply unit 9. This results in a layout wherein the component parts of the water supply device are disposed to assume a higher position than the water storage tank 5, providing further improvement over a water-recovering capability of the water supply device.

Further, although the second embossed section 4b of the under-floor fuel cell system casing 4 protrudes into the vehicle compartment, since the area in which the second embossed section 4b protrudes into the vehicle compartment includes an area that is regarded as the dead space below the seat 2, there is no adverse affect on a space inside of the vehicle compartment. Moreover, it becomes possible to improve a working efficiency during maintenance such as replacement for the ion removal filter and the foreign substance removal filter. Also, the second emboss section 4b may be so structured to be covered with a cover that is detachable during a normal period whereas only during work for replacement, this cover is removed to achieve work for maintenance.

As set forth above, with the sixth illustrative embodiment, since the second embossed section 4b of the under-floor fuel cell system casing 4 is arranged to protrude into the area forming the dead space of the vehicle compartment and the component parts (forming the water supply unit 9) of the water supply device are disposed in the second embossed section 4b whereupon the water storage tank 5 is disposed below the water supply unit 9, a pure water recovering capability of the water supply device can be improved without causing an adverse affect on the spacing inside of the vehicle compartment while, accordingly, permitting the vehicle compartment to be kept in a free design of layout in the vehicle compartment.

The entire content of a Japanese Application No. P2003-179557 with a filing date of Jun. 24, 2003 is herein incorporated by reference.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A vehicle equipped with a fuel cell system, comprising:
 a vehicle body having a floor panel having a tunnel section projecting into a vehicle compartment;
 a casing disposed below the floor panel, said casing having an embossed section projecting into the tunnel section of the floor panel; and
 a fuel cell system including a fuel cell stack and a water supply device configured for supplying water to the fuel cell stack, said water supply device being connected to a water storage tank,
 wherein said fuel cell system is housed in said casing, and
 wherein the water supply device is disposed in the embossed section of the casing below the floor panel of the vehicle body in a higher area than the water storage tank.

2. The vehicle equipped with the fuel cell system according to claim 1, wherein the water supply device includes a unitary structure that serves as a water supply unit.

3. The vehicle equipped with the fuel cell system according to claim 2, wherein the water storage tank is disposed directly below the water supply unit.

4. The vehicle equipped with the fuel cell system according to claim 3, wherein the water storage tank and the water supply unit are integrated in a unitary structure.

5. The vehicle equipped with the fuel cell system according to claim 1, wherein the floor panel and the casing have work access openings, respectively, which are located in correspondence with the water supply device.

6. The vehicle equipped with the fuel cell system according to claim 1, wherein the water supply device comprises a pump that is disposed below the floor panel of the vehicle body in a higher area than the water storage tank.

7. The vehicle equipped with the fuel cell system according to claim 6, wherein the water supply device further comprises a water delivery conduit directly connecting the water storage tank to the pump.

8. The vehicle equipped with the fuel cell system according to claim 6, wherein the water supply device further comprises a water recovery conduit directly connecting the water storage tank to the fuel cell stack.

9. The vehicle equipped with the fuel cell system according to claim 7, wherein the water supply device comprises a pump that is disposed below the floor panel of the vehicle body in a higher area than the water storage tank.

10. The vehicle equipped with the fuel cell system according to claim 9, wherein the water supply device further comprises a water delivery conduit directly connecting the water storage tank to the pump and a water recovery conduit directly connecting the water storage tank to the fuel cell stack.

11. A vehicle equipped with a fuel cell system, comprising:
a vehicle body having a floor panel having an embossed portion projecting toward a vehicle seat mounted on the floor panel;
a casing having an embossed section projecting into the embossed portion of the floor panel, said casing being disposed below the floor panel; and
a fuel cell system including a fuel cell stack and a water supply device configured for supplying water to the fuel cell stack, said water supply device being connected to a water storage tank,
wherein said fuel cell system is housed in said casing, and
wherein the water supply device is disposed in the embossed section of the casing at a higher level than the water storage tank.

* * * * *